Inventor
Berthold A. Knauth
by Andrus and Smith
His Attorneys

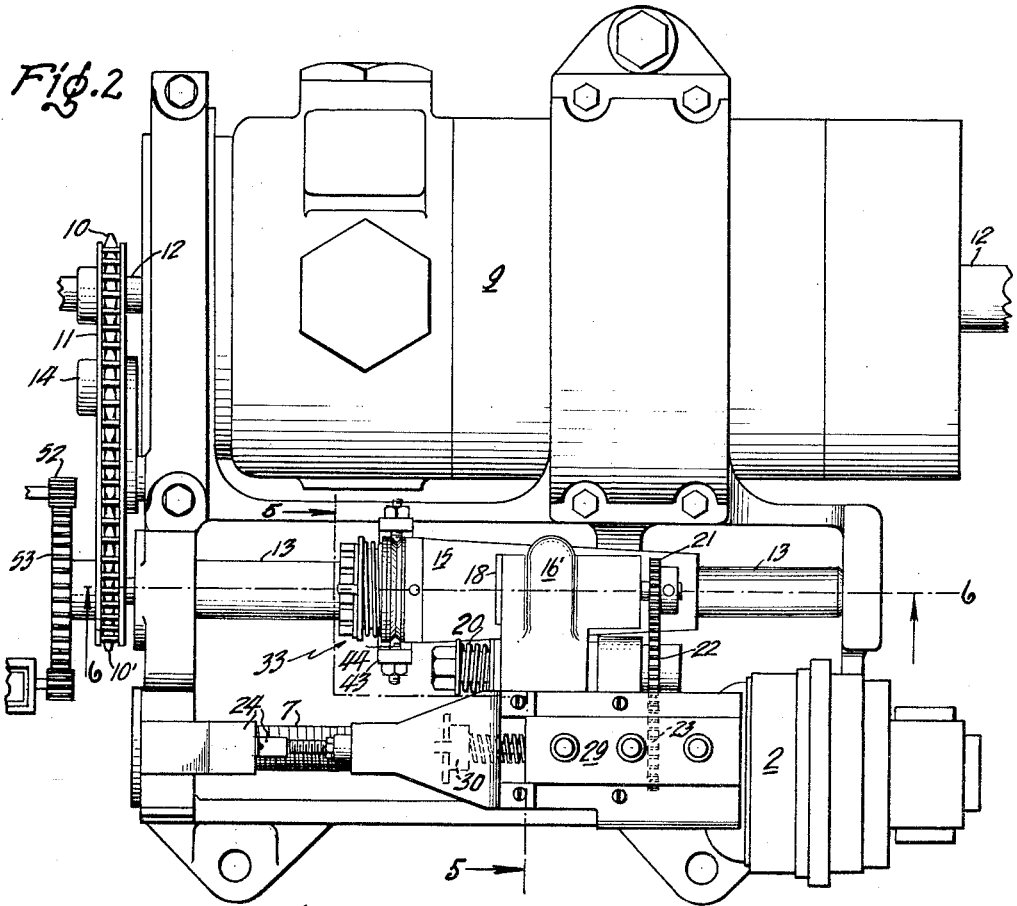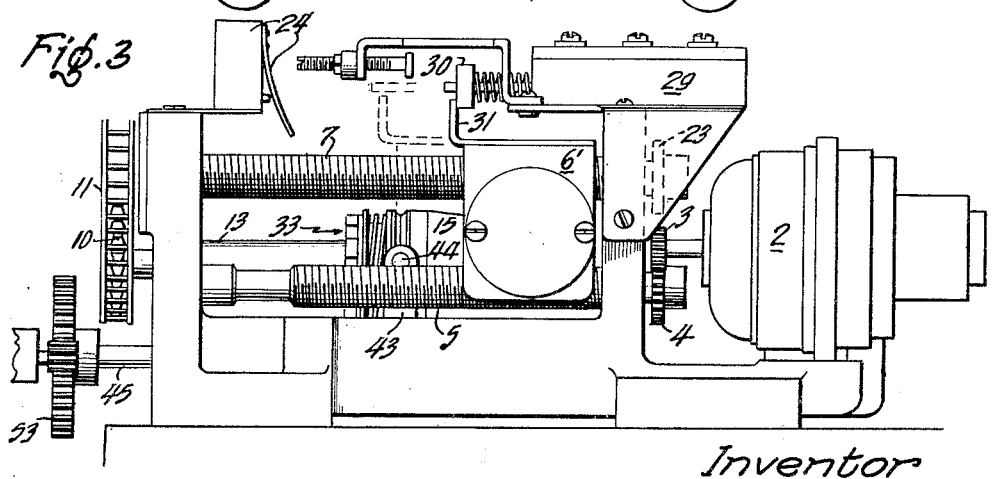

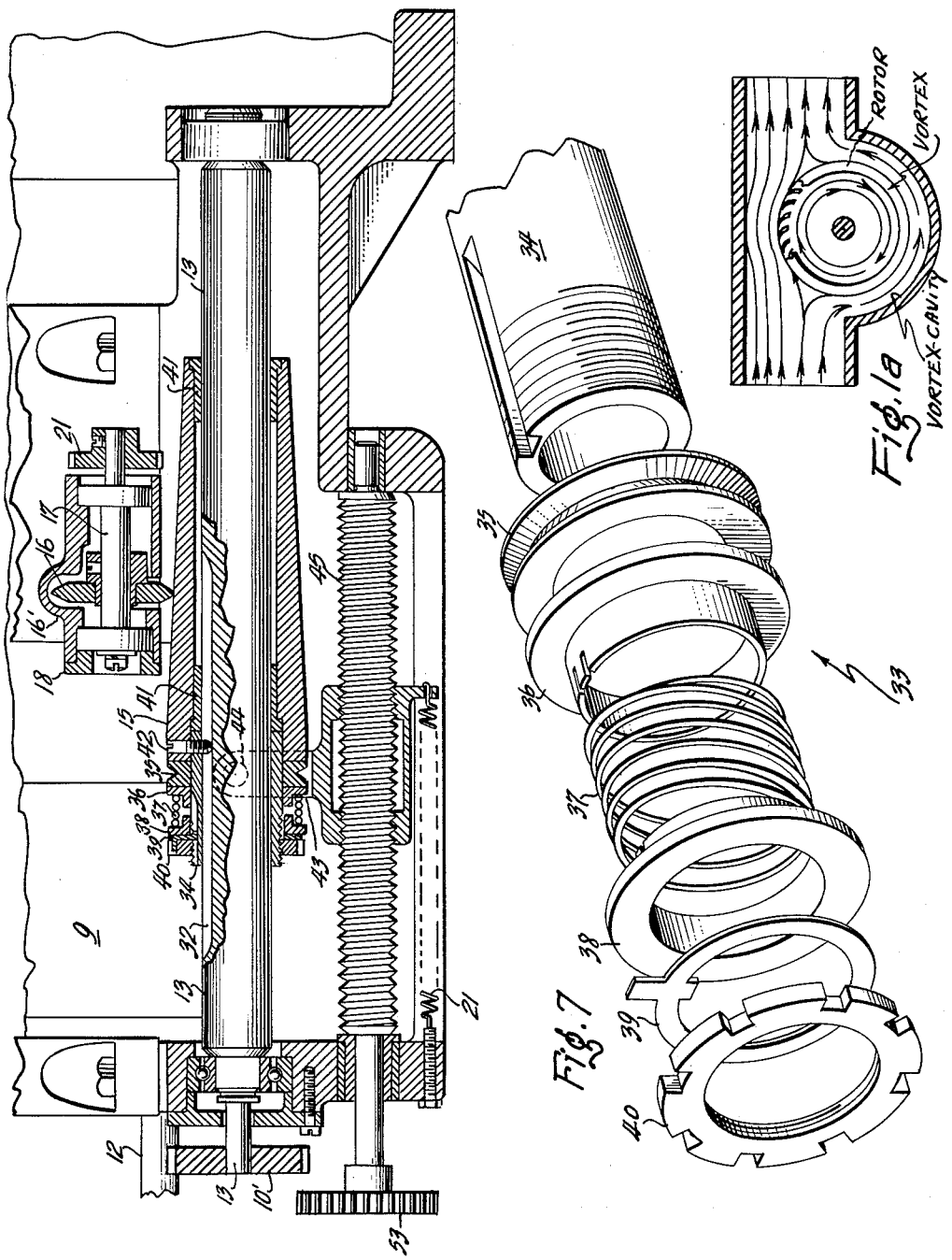

Sept. 11, 1962      B. A. KNAUTH      3,053,085
SYNCHRONOUS TORQUE AMPLIFIER
Filed Dec. 26, 1957      5 Sheets-Sheet 5
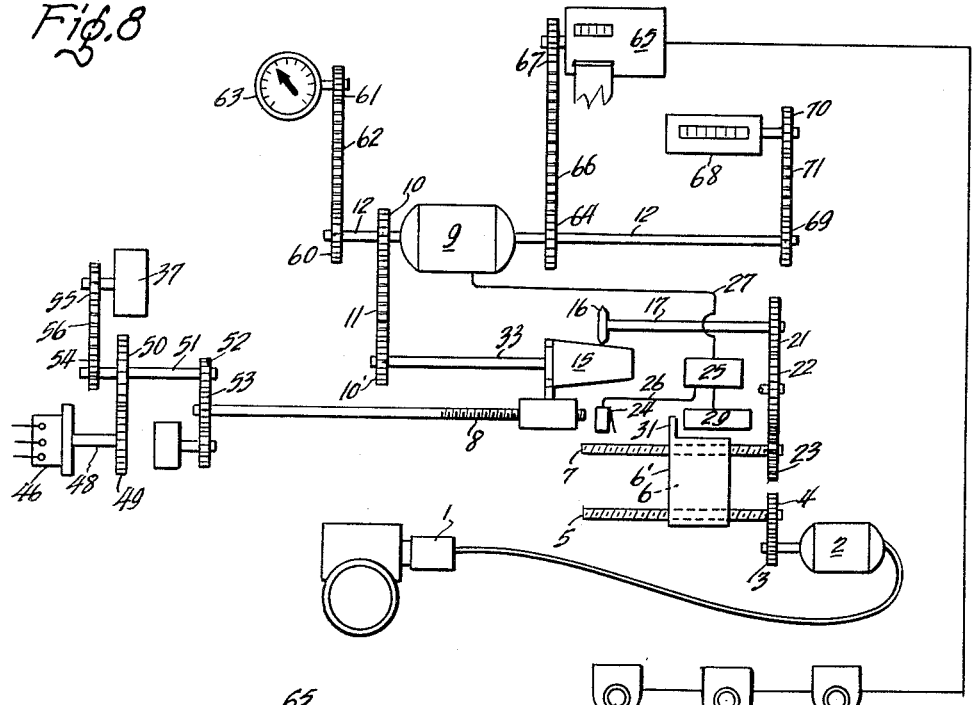
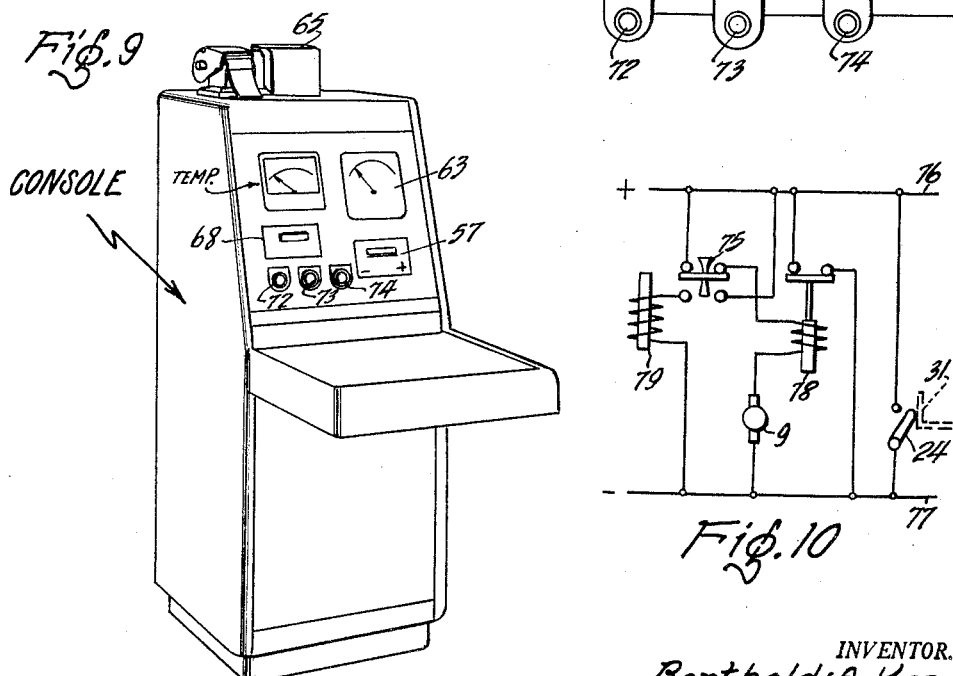
INVENTOR.
Berthold. A. Knauth
BY
Andros & Smith
His Attorneys

United States Patent Office 3,053,085
Patented Sept. 11, 1962

3,053,085
SYNCHRONOUS TORQUE AMPLIFIER
Berthold A. Knauth, Woodstock, N.Y., assignor, by mesne assignments, to Rotron Manufacturing Co., Inc., Woodstock, N.Y., a corporation of New York
Filed Dec. 26, 1957, Ser. No. 705,432
19 Claims. (Cl. 73—229)

This invention has to do with a synchronous torque amplifier for controlling the operations of a mechanism from a remotely located device which is the source of its control. More specifically, it relates to a variable ratio synchronous torque amplifier for remote flowmeter registration with printed read-out, and the provision of such an amplifier, including a system incorporating the same, is one of the principal objects of the invention.

In two co-pending applications, Serial Nos. 532,187, filed Sept. 2, 1955, now Patent No. 2,906,121 and Serial No. 609,708, filed Sept. 13, 1956, now Patent No. 2,845,798, I have described and claimed novel types of flowmeters for gases and liquids based upon my discovery of certain new "vortex-velocity" principles of flow peculiar to such flowmeters in which the rate of rotation of the vortex created therein bears a linear relation to the rate of fluid flowing therethrough; and, while not limited thereto, the present invention is particularly adaptable for use in conjunction therewith, having, in fact, been specifically designed therefor. Thus, the present application may be regarded as a continuation of the above mentioned related co-pending applications.

Flowmeters usually operate in hazardous areas and are generally placed outdoors because of the danger, for example, of explosions. Recording or registering instruments must operate in non-hazardous areas which are air-conditioned or otherwise immune to vapors, etc. and it is, as a practical matter, desirable to have such instruments indoors and, either of necessity, or by design, at more or less remotely located zones or stations. Therefore, depending upon the degree of remoteness of the recording or registering instrument from the flowmeter, some form of communication between the points of location of the flowmeter and the instrument is necessary, in which case, except for the present invention, communication by such means as telegraph, teletype, telephone, radio, or the like, would have to be relied upon. That such means of communication are too often complicated and impractical readily becomes obvious, but a satisfactory solution to the problem does not. Such a solution requires a system embodying an instrument, with means for proper correction factors, to register or indicate the number of revolutions of a rotatable member at a place remote therefrom, and to actuate a device that requires power or torque in exact synchronism with such member, accurately to determine, for example, the quantity of fluid passing through a flowmeter at a remote point, or selectively to control the operation of some other device, without imposing any mechanical load on the member which initiates the source of energy regardless of how small or delicate the latter may be. This now has been accomplished by means of the present invention, accompanied by many advantages and new results that flow therefrom, and the provision of the apparatus for carrying out the invention, generally is the object of the invention. In other words, broadly stating the invention commensurate with the scope of the disclosure, it is an object to provide in such a system the control of the functions of a device in motion with means cooperatively associated therewith synchronously to transmit such functions electrically to a station remote therefrom, and means at such station to receive and synchronously to amplify the transmission of such functions mechanically, whereby selectively to control the operation of another device or mechanism.

More specifically, it is an object of the invention to provide a system or apparatus for use in recording the throughput of a flowmeter while in motion, having means coupled with the flowmeter synchronously to translate rotary motion therein electrically into signals and transmit them to a remote station, provided with a variable ratio synchronous torque amplifier that includes a differential computer mechanism, to re-translate said signals into rotary motion and transmit them to a recording device, and means simultaneously to halt the amplifier and to record the current through-put of the meter in the recording device, while the meter continues to operate the computer mechanism.

Another specific object of the invention is the provision of a differential computer mechanism preferably comprising a first rotatable member adapted continuously to be rotated in one direction in consonance with the rotation of a remotely located rotary device, a second rotatable member adapted intermittently to be rotated in the opposite direction, and a third rotatable member cooperatively associated with the first and second members to rotate in unison therewith when both are in motion, but mechanically to store in the mechanism the number of rotations of the rotary device when the second member is halted.

Another specific object of the invention is the provision of means, such as a servo-loop, to stabilize the differential computer mechanism and preferably comprises a variable speed motor, a differential starter switch for the motor, a variable speed motor controller connected to the switch and motor, and a potentiometer cooperatively associated with the differential computer mechanism, whereby the latter is adapted to close the switch to start the motor and to activate the potentiometer to control the speed of the motor.

Another specific object of the invention is the provision of a variable ratio drive mechanism connected to the differential computer mechanism, whereby selectively to inject into the latter a correction factor, of which drive mechanism preferably comprises driving means of variable circumference, rotatable means, connected to the computer, to be driven by the driving means at a rate varying as a function of the point on the circumference against which it makes contact, and means to adjust the rotatable member by driving means relative to each other.

Other specific objects of the invention are the provision of means cooperatively associated with the foregoing structures and mechanisms in such a system, such as, for example, a totalizer register to totalize the number of net units of flowmeter through-put; a printing mechanism to print out the total or current reading alone, as well as to reset the same to zero; and a differential limit switch arrangement together with a dropout switch and motor relay in circuit with a variable speed output motor, whereby to open the circuit to stop the motor and record the current meter through-put, while the meter continues to operate, mechanically to store rotations transmitted from within the flowmeter, and to advance and close the circuit by closing the limit to re-start the motor.

Other objects of the invention will in part be obvious and will in part appear hereinafter.

The invention accordingly comprises a system, or machine, or apparatus comprising the features of construction, combination of elements, and arrangement of parts which will be exemplified in the construction hereinafter set forth, and the scope of the application of which will be indicated in the claims.

For a fuller understanding of the nature and objects of the invention, reference should be had to the following detailed description, taken in connection with the accompanying drawings, in which:

FIG. 1a is a sectional view through a portion of a flowmeter of the type shown in FIG. 1;

FIG. 2 is a plan view of an actual embodiment of the torque amplifier of the invention, looking down upon the differential computer mechanism, variable ratio drive mechanism, and driving motor;

FIG. 3 is a front elevational view of FIG. 2 looking at the differential computer mechanism;

FIG. 6 is an enlarged longitudinal sectional view taken along the lines 6—6 of FIG. 2 and looking in the direction of the arrows at the variable speed drive mechanism;

FIG. 7 is a further enlargement in perspective of the cone thrust bearing of FIG. 6;

FIG. 8 is a simplified graphic illustration of FIG. 1;

FIG. 9 is a perspective view of a console for the invention; and

FIG. 10 is a wiring diagram illustrating a read-out hook-up.

Figure 1:
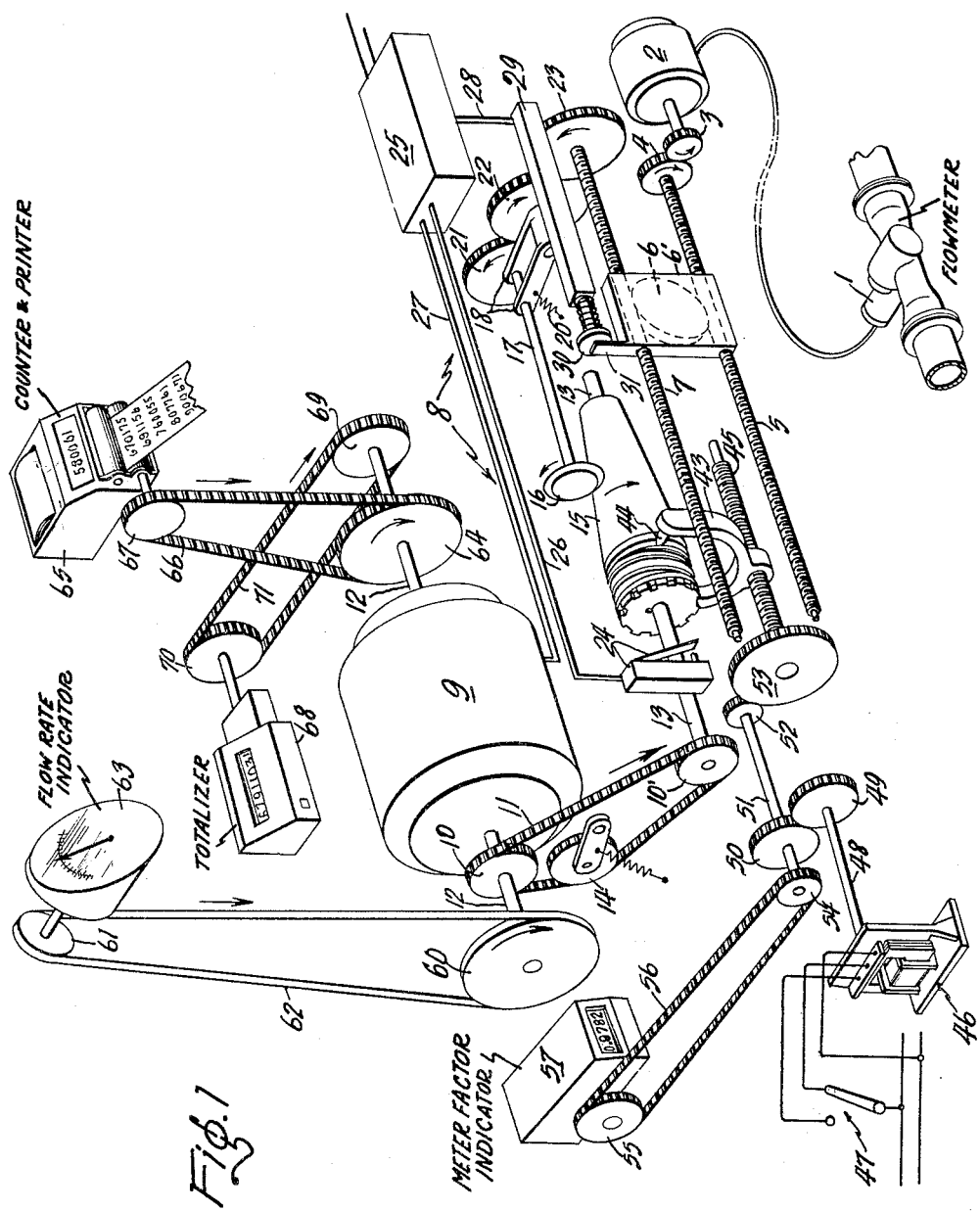
FIG. 1 is a schematic perspective view illustrating the invention.
Figure 4:
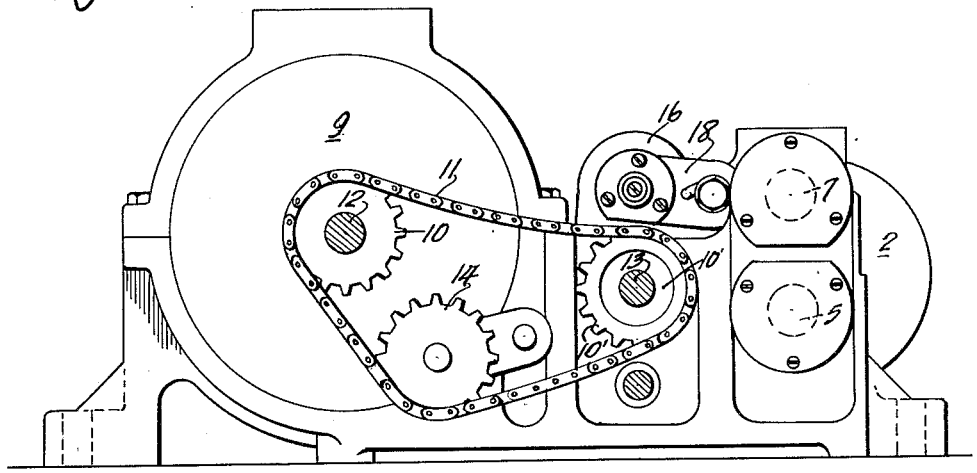
FIG. 4 is an end elevational view of FIG. 2.
Figure 5:
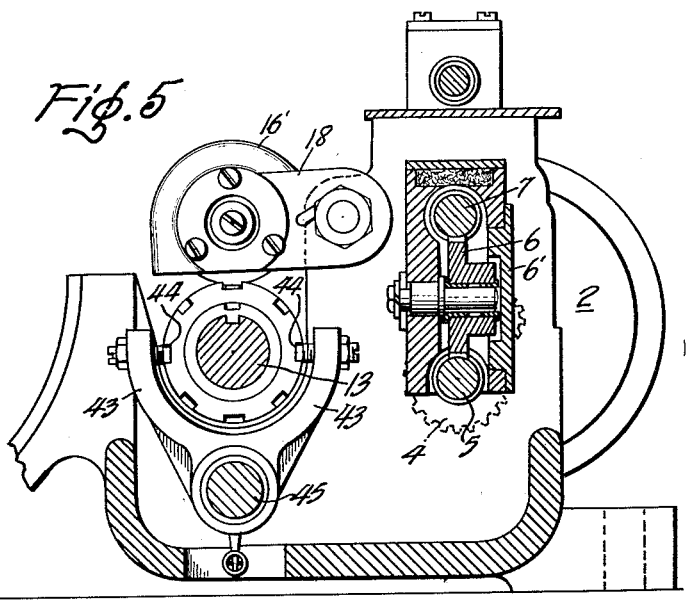
FIG. 5 is a transverse sectional view taken along the line 5—5 of FIG. 2 and looking in the direction of the arrows.

In my copending applications I have coined the expression "Vortex-Velocity" to denote this new type of flowmeter, one of which is shown herein in FIG. 1 of the drawings and labeled Flowmeter. In such a flowmeter a vortex is deliberately created and maintained so that its peripheral motion is locked to the velocity of the fluid stream to be measured. By giving certain proportions to the internal structure of such a dynamic fluid arrangement, a linear relationship can be established between the number of revolutions of the vortex in the vortex chamber of the conduit and the fluid velocity therethrough. A true and accurate volumetric flowmeter is thus obtained. In structure, a flowmeter of this type comprises a short conduit, generally of slightly smaller diameter than the pipeline in which it is installed, and a vortex chamber in which the vortex is created and maintained as illustrated in the drawings. Although the basic fluid dynamic structure of this flowmeter is simple, the detailed operation is quite intricate.

There are at least two features of this type of flowmeter which are outstanding when compared to orifice type meters, which are so widely used in gas measurements. One feature of my flowmeter is that it constitutes an integrating meter which measures volume directly in that the number of revolutions which the rotor of the meter makes is directly proportional to the total flow that has passed therethrough. Another feature of my flowmeter is that the output of the meter has a linear relationship to the flow and not one that is parabolic. This, of course, allows great accuracy to be obtained.

My vortex-velocity fluid flowmeter will measure gases equally as well as liquids. In fact, the performance is the same, for example, for air as for water. The only limitation for use with low density fluids is that the output load on the rotor shaft must be held within the limits imposed by the lower energy content of the flowing gas as contrasted with the flowing liquid.

The operation of the vortex velocity flowmeter is based on my discovery of certain dynamic principles of fluid flows which can be treated mathematically. It can thereby be shown that it is possible to measure flows by measuring the velocity of one flow line only. Reduction to practice further shows that a flowmeter built on such principles is unusually accurate and responsive and provides new and unobvious, as well as unforseen, results and advantages. Since such a flowmeter deals with the engagement of two flows it will not be affected by wear and tear of the moving parts because such parts play no primary role in the system. Thus, the principle is based on the coupling together of two types of flows which then form one geometrical pattern with a direct and well-defined relationship between the flow velocities of each. Therefore, it is only necessary to measure the flow velocity of one flow line in either branch to know the corresponding velocity of every other flow line. The two types of flows may be designated as main flow, which has its source and sink outside of the meter, and a free vortex flow which is entirely confined within the walls of the flowmeter.

When fluid flows through such a flowmeter as shown in FIG. 1, there is a possibility that a variety of flow patterns will occur, all mathematically substantiated, though not necessarily stable. One would expect that the flow lines upon entering the cavity would expand into it without establishing a vortex and that this would seem to be the flow pattern of highest stability. However, this is not the fact, because at the normal rate of fluid flow through pipe lines, the Reynolds number is sufficiently high that the flow is not necessarily laminar but a turbulent one. In other words, there are always present in the flow small vortices and in some cases even cork-screwing flow patterns. When these vortices enter the vortex chamber, they naturally expand into one or more large size vortices. FIG. 1–a shows a vortex with the main flow enveloping it from both sides.

The angular velocity of any vortex flow-line is directly proportional to the linear velocity of the main flow. Integration over the cross-section of the main flow will give the flow of fluid through the flowmeter. It is then only necessary to measure the revolutions of one flow line in the vortex to obtain either the rate of flow, or totalized flow, over a certain time, through the meter, irrespective of the changes in its rate. The introduction of a rotor or runner, preferably a squirrel-cage wheel, into the vortex cavity, solves the problem of maintaining stable dimensions of the vortex over a wide range of flow rates, whereby flowmeters that maintain extreme accuracy are realized.

A further outstanding characteristic of this type of flowmeter is that the calibration thereof is inherent in its dimensions, rather than being dependent on tightness of fluid compartments, as in positive displacement meters, whereby the calibration changes with degree of leakage. The vortex-velocity flowmeter therefore retains its calibration through its life and is not affected by wear and tear.

The present invention provides a new meter read-out system that is remote from flowmeter operation and can be placed in any conventional office locality rather than relying on direct read-out at an open air station. This is a feature of great convenience and economy and tends to lead to greater accounting accuracy.

As briefly as possible, by way of preliminary explanation, the present flowmeter is fitted with two magnetic output couplings to which a variety of direct and remote read-out equipment can be applied.

In the system illustrated in the drawings, an electric selsyn transmitter is applied to one of these two outputs at the flowmeter, which transmitter is in turn connected to a remote receiving selsyn motor in the station office. This receiving selsyn now turns in synchronism with the flowmeter and constitutes the input of a unique synchronous torque amplifier. The torque amplifier controls a powerful, variable-speed electric motor from the output of which a variety of read-out equipment is driven, as may be required by the practice in any particular flowmeter station. The selsyn receiver causes an imbalance on a differential screw computer mechanism, which imbalance is in turn transmitted to a transducer that controls the speed of the variable-speed motor, thereby completing a servo-loop and stabilizing the circuit at the required level.

There is also provided a combined meter factor adjustment. This is accomplished by interposing between the variable speed motor and the differential mechanism, a speed changer of the infinitely variable type, whose function is to inject into the differential computer mechanism, whenever required, the combined meter factor adjustment. This combined meter factor will cover any necessary corrections, such as, for example, temperature, viscosity, rate, etc., in accordance with best flowmeter practice. Meter factor, if other than unity, must be established from rate as indicated on the flow rate indicator on the console from viscosity by specification, or tests, and from product temperature. The meter factor setting of the speed changer is affected manually by a hand-wheel (not shown) or by electrical drive, as shown, and is indicated by a digital, 5-figure counter mounted on the instrument panel of the console. The setting is reproducible to within four decimal places. Having set into the computer the proper factors, the variable speed motor now turns at a rate of one revolution for every net unit of product, and both the totalizer and ticket printer record factored and temperature corrected net units.

Regarding these latter operations, a further unique feature of the system is that any and all read-out and printed operations can be made with the main motor output shaft at rest. For example, whenever a counter is to be read, or a printer to be operated, a corresponding push-button temporarily stops the central output variable-speed motor automatically. During this interval, of approximately thirty seconds, readings are mechanically stored and memorized in the differential computer mechanism, and subsequently are transferred to the counters upon the automatic reclosing of the circuit.

Another unique feature of the console, besides a totalizer and batch counter, and a continuously indicating rate flow indicator, all reading the net corrected units, is a ticket or tape printer. By manipulation of proper push-buttons, this printer can either print the current total, or can print and reset to zero. The latter feature can be used when filling tanks or the tender changes in a product pipeline. Printing can be initiated from any desired location, for example, at a manual valve station, simply by branching an electric push-button in that location.

Referring now more particularly to the drawings, and especially FIG. 1, there is shown a flowmeter connected in a pipe line. Attached to the flowmeter is a selsyn transmitter 1, in an exlosion-proof housing and connected to the rotor within the flowmeter by means of a magnetic pick-up coupling and gear train. The selsyn transmitter is connected by means of a cable to a selsyn receiver 2. A pinion driving gear 3, connected to the shaft of the selsyn receiver, is meshed with a driven gear 4 on the end of a differential worm screw 5. This worm screw continues to rotate in one direction at all times while the flowmeter is in operation. Meshed with the worm screw 5 is a worm idler wheel 6, enclosed in a suitable casing 6', and this worm wheel and differential worm screw 5 form a part of the differential computer mechanism, whereby to accumulate revolutions of the rotary motion of the meter while the latter is in continuous operation, when the remainder of the amplifier, about to be described, is halted.

The second differential worm screw 7, disposed in parallel relation to the worm screw 5, is also meshed with the idler wheel 6 and is intermittently rotatable in a direction opposite that of the continously rotatable worm screw 5.

The operation of the worm screw 7 depends upon whether or not the synchronous torque amplifier mechanism, indicated generally at 8, is in operation.

The synchronous torque amplifier mechanism, including its variable ratio drive mechanism, and other connected devices, is operated by a centrally located variable speed output motor 9. On one end of the shaft 12 of this motor is attached a driving gear 10 connected by means of a chain 11 to a driven gear 10' which in turn is attached to a shaft 13. A spring-loaded gear 14 rides one length of the chain to take up the slack. The shaft 13 carries a slidably mounted cone 15 of variable circumference which in turn rotates a fixed roller 16 having a knife edge bearing against the surface of the cone, which roller is mounted in a suitable housing 16' (see FIG. 6). The roller 16 is connected to the end of a shaft 17 mounted in the end of a pivoted bearing 18 which is spring-loaded by means of a spring 20 positively to hold the knife edge of the roller 16 against the surface of the cone. The other end of the shaft 17 carries a drive gear 21, meshed with an idler gear 22 which in turn is meshed with a driven gear 23 connected to the end of the differential worm screw 7, whereby the latter is intermittently operated depending upon whether the variable speed motor 9 is in operation or not.

The motor 9 will be brought into operation the moment finger 31 releases spring-loaded plunger 30 of potentiometer 29, thereby freeing the potentiometer from its zero position; and the speed of the motor will increase with further outward movement of the plunger 30.

The motor 9 is also connected to motor controller 25 by a cable 27. Also connected with the motor controller 25 by means of a cable 28, is the potentiometer 29, having the spring-loaded reciprocal plunger 30 housed therein, whereby the voltage is increased or decreased to control the speed of the motor 9 as the plunger is reciprocated. The member 30, while the motor is in operation, is normally in contact with the finger 31 extending from the casing 6' for the worm wheel 6.

If, for example, the motor 9 is not in operation when the flowmeter first starts operating, as when the motor manually has been stopped, or a read-out has been made, the differential worm screw 7 will not be rotating. However, if the flowmeter is in operation, the selsyn transmitter 1, that is coupled magnetically with the flowmeter rotor, will translate the rotating motion of the rotor within the meter electrically into signals and transmit the same to the selsyn receiver 2, which in turn translates the electrical signals into rotary motion to cause rotation of the differential worm screw 5. Since the worm screw 7 is not rotating, the idler wheel 6 and its casing 6' will continue to move in between both worm screws 5 and 7 in the direction of the differential limit switch 24, connected to the motor control 25 by cable 26, until the contact finger 31 strikes the finger on the switch 24 and closes the circuit. Immediately, the motor 9 will start to operate at high speed under the control of the motor controller 25 and the potentiometer 29, whereupon the idler wheel and casing rapidly will move in the opposite direction along worm screws 5 and 7 so that the finger 31 will actuate the plunger 30 of the potentiometer to bring about a synchronous balance in the system as the result of the imbalance that was established in memorizing, or storing, the number of accumulated rotations of the rotary member in the flowmeter that had been transferred to the worm screw 5. Thus, a servo-loop is provided to stabilize the differential computer mechanism between the variable speed motor 9, the switch 24, the motor controller 25 and the potentiometer 29. The various correction factors hereinbefore referred to are injected into the variable speed ratio synchronous torque amplifier through the cone 15 and related mechanisms. The assembly of the slideably mounted cone is depicted in greater detail in FIGS. 6 and 7. On shaft 13, which has a flute or groove 32, there is a slideably mounted thrust bearing assembly indicated generally at 33 in FIG. 7. This assembly comprises a sleeve 34, a thrust V-bearing 35, an L-collar 36, a pressure spring 37, a second L-collar 38, a washer 39, and a locknut 40. These members are assembled in compressed relation on the shaft 13 as shown in FIG. 6 and the opposite end of the sleeve 34 carries the cone 15 in supporting bearing members 41. A screw 42 passes through the cone 15 and sleeve 34 to seat in the groove or flute 32 so that the entire cone and thrust bearing assembly is in slideable alignment on the shaft 13.

The desired meter factor or other correction factors are established by the position of the cone 15 on the shaft 13 relative to its position with respect to the roller 16. In order to bring about the positioning of the cone as desired there is provided a yoke 43 having pointed members 44 that ride in the thrust V-bearing member 35. The yoke is mounted to be reciprocated, within the cone and bearing assembly, by means of a screw 45 and this may be done by having a hand wheel (not shown) attached to one end of the screw 45 and manually injecting the correction. However, I prefer to do this automatically by means of a reversible motor illustrated generally at 46 in FIG. 1 that is controlled by a reversing switch 47. Attached to the motor 46 is a driving shaft 48 carrying a drive gear 49 which in turn drives a gear 50 attached to a shaft 51, which in turn carries a driving pinion 52 meshed with a driven gear 53 (rather than a hand wheel) attached to the end of the yoke controlling the screw 45. The shaft 51 also carries a driving pinion gear 54, to drive a gear 55 through a chain 56 to operate a meter factor indicator 57 permanently indicating the ratio setting of the cone 15.

Also attached to the shaft 12 of the motor 9 is a V-pulley 60 that drives another smaller V-pulley 61, through a quarter-turn belt 62, to operate a flow rate indicator 63.

An oppositely extending part of the shaft 12 of the motor 9 carries a gear or sprocket 64 to operate a counter and ticket-printing device 65 through a chain 66 and gear or sprocket 67 connected therewith.

This same portion of the shaft 12 operates a totalizer 68 through driving and driven sprockets, 69 and 70, by means of a chain 71.

All of this system or apparatus, except the flowmeter and selsyn transmitter, which are remotely located, and the printer mechanism, may be housed in the console shown in FIG. 9, although the printer there shown is housed on top of the console. This console has several readily available push buttons to operate control switches and such related mechanisms as above described, for example, a print and reset button 72, a print only button 73 and a read only button 74.

The differential switching arrangement is readily seen in the wiring diagram of FIG. 10. Briefly, when the push button switch 75 is closed as shown, the circuit of the main lines 76 and 77 carry current therethrough and operate a drop-out relay indicated at 78 to the motor 9. When the push button switch 75 is moved, for example, to print, the drop-out relay 78 opens the circuit but the switch 75 closes the circuit, for example, to activate the printing mechanism through the print relay indicated at 79.

The printing mechanism having operated, the motor 9 remains inoperative, unless started by manual switch control, until the finger 31 again closes the differential limit switch 24.

The many features, advantages and new results of the present invention as above described should by now be obvious, and now briefly may be summarized in part, together with others, not readily apparent or not mentioned, as follows:

(1) Sizeable electrical equipment can now be operated in exact consonance with an initial source of control, as with the number of revolutions of the rotor of a flowmeter, without reflecting back any appreciable load upon the prime mover which might impair its accuracy and performance characteristics;

(2) The flowmeter runs with constant load and it is therefor possible to calculate or measure the effect of constant load and to calibrate the meter on this basis;

(3) Variations in load of the variable speed output motor are not reflected back on the meter;

(4) The continuously operating portions of the differential computer mechanism accurately store or memorize the number of rotations of the continuously operating flowmeter, whenever the remainder of the system momentarily is halted, and synchronously to reestablish the same within an appreciable short time after the entire system again is manually or automatically put back in operation;

(5) By means of the variable ratio drive, the register, or recorder, accurately can be made to show net quantities corrected for meter factor, thermal expansion, differences in density and gravity, etc., the variable ratio drive having resetability to four decimal places.

Since certain changes may be made in the above construction and different embodiments of the invention could be made without departing from the scope thereof, it is intended that all matter contained in the above description or shown in the accompanying drawing shall be in interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a variable ratio torque amplifier comprising a differential computer mechanism having a first rotatable member adapted continuously to be rotated in one direction in consonance with the rotation of a remotely located rotary device, a second rotatable member adapted intermittently to be rotated in the opposite direction, and a third rotatable member cooperatively connected with said first and second members to rotate in unison therewith when both are in motion but continuously rotatable with said first member when said second member is halted, mechanically to store in said mechanism the number of rotations of said device when said second member is halted, and all of said members being inseparably mounted with respect to each other; means cooperatively connecting said rotary device with said first member and adapted to motivate said first member continuously; and means cooperatively connected to said second member and adapted to motivate said second member intermittently.

2. In a torque amplifier of the character defined in claim 1, and further characterized in that said first motivating means comprises a selsyn transmitter coupled to said rotary device with a selsyn receiver connected to said first member.

3. In a torque amplifier of the character defined in claim 1, and further characterized in that said second motivating device comprises a variable speed output motor.

4. In a torque amplifier of the character defined in claim 1, and further characterized in that said first and second members comprise worm screws, and said third member comprises a worm idler wheel meshed between said screws.

5. In a torque amplifier of the character defined in claim 1, and further characterized in that said last named means comprises a variable speed motor, a motor controller, and a potentiometer cooperatively connected with said differential computer mechanism, whereby to control the operation of said motor.

6. In a torque amplifier of the character defined in claim 1, and further characterized in that said last named means comprises a servo-loop to stabilize said computer mechanism, including a variable speed motor, a starter switch for said motor, a motor controller connected with said switch and motor, and a potentiometer cooperatively connected with said computer mechanism, which computer mechanism is adapted to close said switch to start said motor and to actuate said potentiometer to control the speed of said motor.

7. In a system of the character described adapted for use in recording the through-put of a flowmeter while in motion, means coupled with said flowmeter synchronously to translate rotary motion within said meter electrically into signals and transmit them to a remote station, a variable ratio synchronous torque amplifier, including a differential computer mechanism, to re-translate said signals into rotary motion and transmit them to a recording device, and means simultaneously to halt said amplifier and to record the current through-put of said meter in said recording device while the meter is in continuous operation together with said computer mechanism, said differential computer mechanism comprising a first rotatable worm screw that continues to turn at all times to accumulate revolutions of the rotary motion of the meter while the latter is in continuous operation and the remainder of the amplifier is halted, a second oppositely rotatable worm screw that ceases to turn with the halting of the amplifier, an idler worm wheel meshed with said screws to travel therebetween, and a potentiometer operated by means carried by said worm wheel to control the speed of an output motor.

8. In a system of the character described adapted for use in recording the through-put of a flowmeter while in motion, means coupled with said flowmeter synchronously to translate rotary motion within said meter electrically into signals and transmit them to a remote station, a variable ratio synchronous torque amplifier, including a differential computer mechanism, to re-translate said signals into rotary motion and transmit them to a recording device, and means simultaneously to halt said amplifier and to record the current through-put of said meter in said recording device while the meter is in continuous operation together with said computer mechanism, said amplifier including a variable ratio drive mechanism cooperatively connected to the differential computer mechanism, whereby selectively to inject into the latter mechanism a correction factor and said variable ratio drive mechanism comprising longitudinally movable rotating driving means of variable circumference, longitudinally fixed rotatable means connected to said computer to be driven by said driving means at a rate varying as a function of the point on said circumference against which it makes contact, and means to move said driving means longitudinally.

9. In a system of the character described adapted for use in recording the through-put of a flowmeter while in motion, means coupled with said flowmeter synchronously to translate rotary motion within said meter electrically into signals and transmit them to a remote station, a variable ratio synchronous torque amplifier, including a differential computer mechanism, to re-translate said signals into rotary motion and transmit them to a recording device, and means simultaneously to halt said amplifier and to record the current through-put of said meter in said recording device while the meter is in continuous operation together with said computer mechanism, said amplifier including a variable ratio drive mechanism cooperatively connected to the differential computer mechanism, whereby selectively to inject into the latter mechanism a correction factor, said variable ratio drive mechanism comprising a motor driven cone slidably mounted on a shaft to provide a driving means of variable circumference, a fixed roller connected to said computer to be driven by said cone at a rate varying as a function of the point on the cone against which it makes contact, and an adjusting screw and yoke connected with said cone to adjust the position thereof relative to the fixed position of the roller.

10. In a system of the character described adapted for use in recording the through-put of a flowmeter while in motion, means coupled with said flowmeter synchronously to translate rotary motion within said meter electrically into signals and transmit them to a remote station, a variable ratio synchronous torque amplifier, including a differential computer mechanism, to re-translate said signals into rotary motion and transmit them to a recording device, and means simultaneously to halt said amplifier and to record the current through-put of said meter in said recording device while the meter is in continuous operation together with said computer mechanism, said last named means comprising a differential limit switch, a drop-out motor relay and switch in line circuit with a variable speed motor, whereby to open the circuit to stop said motor and record said current meter throughput, while said computer mechanism continues to operate, mechanically to store rotations transmitted from within the flowmeter, and to advance to close the circuit by closing the limit switch through means attached to said computer.

11. In a variable ratio torque amplifier comprising a differential computer mechanism having a first rotatable member adapted continuously to be rotated in one direction in consonance with the rotation of a remotely located rotary device, a second rotatable member adapted intermittently to be rotated in the opposite direction, and a third rotatable member cooperatively connected with said first and second members to rotate in unison therewith when both are in motion but mechanically to store in said mechanism the number of rotations of said device when said second member is halted; means cooperatively connecting said rotary device with said first member and adapted to motivate said first member continuously; a variable ratio drive mechanism cooperatively connected with said computer mechanism selectively to inject therein a correction factor; and means cooperatively connected to said second member through said drive mechanism and adapted to motivate said second member intermittently, said variable ratio drive mechanism comprising longitudinally movable rotating driving means of variable circumference, longitudinally fixed rotatable means connected to said computer to be driven by said driving means at a rate varying as a function of the point on said circumference against which it makes contact, and means to move said driving means longitudinally.

12. In a variable ratio torque amplifier comprising a differential computer mechanism having a first rotatable member adapted continuously to be rotated in one direction in consonance with the rotation of a remotely located rotary device, a second rotatable member adapted intermittently to be rotated in the opposite direction, and a third rotatable member cooperatively connected with said first and second members to rotate in unison therewith when both are in motion but mechanically to store in said mechanism the number of rotations of said device when said second member is halted; means cooperatively connecting said rotary device with said first member and adapted to motivate said first member continuously; a variable ratio drive mechanism cooperatively connected with said computer mechanism selectively to inject therein a correction factor; and means cooperatively connected to said second member through said drive mechanism and adapted to motivate said second member intermittently, said variable ratio drive mechanism comprising a motor driven cone slidably mounted on a shaft to provide a driving means of variable circumference, a fixed roller connected to said computer to be driven by said cone at a rate varying as a function of the point on the cone against which it makes contact, and an adjusting member connected with said cone to adjust the position thereof relative to the fixed position of the roller.

13. In a system of the character described adapted for use in recording the through-put of a vortex-velocity flowmeter while in motion, a vortex rotor having a peripheral discharge locked in the velocity of the fluid stream passing through said meter, means coupled with said rotor synchronously to translate rotary motion within said meter electrically into signals and transmit the same to a station remote therefrom, a variable ratio synchronous torque amplifier, including a differential computer mechanism having first and second shafts, second means to reconvert said signals into rotary motion, said first shaft driven in rotary motion by said second means, a recording device, variable speed means independently actuating said recording device in accordance with the speed thereof, said second shaft driven synchronously in rotary motion by said variable speed means, variable position actuating means operably connected with said shafts and positioned thereby and the position of which is set by the difference in total rotation between said shafts, speed control means of said variable speed means actuated by the position of said actuating means and means to halt the rotation of said second shaft without affecting the rotation of said first shaft whereby the position of said actuating means continues to change and indicate the relative total rotation of each of said shafts.

14. In a system of the character defined in claim 13, and further characterized in that said first named means includes a selsyn transmitter magnetically coupled with said rotor.

15. In a system of the character defined in claim 13, and further characterized in that the variable speed means includes a variable speed motor, and the speed control means includes a motor controller and a potentiometer cooperatively connected with said differential computer mechanism to control the speed of said motor.

16. In a system of the character defined in claim 13, and further characterized in that the variable speed means includes a variable speed motor, a starter switch for said motor, and the speed control means includes a motor controller connected to said switch and motor, and a potentiometer cooperatively connected with said differential computer mechanism, said mechanism being adapted to close said switch to start said motor and to actuate said potentiometer to control the speed of said motor.

17. In a system of the character defined in claim 13, and further characterized in that said amplifier includes a variable ratio drive mechanism, including a slidably mounted rotatable cone of variable circumference, cooperatively connected to the differential computer mechanism, whereby selectively to inject into the latter mechanism a correction factor.

18. In a system of the character defined in claim 13, and further characterized in that said recording device includes a totalizer register to indicate the current number of net units of meter through-put.

19. In a system as defined in claim 13, and further characterized in that said recording device includes a printing mechanism to print out the current total net units of meter through-put.

References Cited in the file of this patent

UNITED STATES PATENTS

| | | |
|---|---|---|
| 1,881,572 | Herz | Oct. 11, 1932 |
| 2,714,310 | Jennings | Aug. 2, 1955 |
| 2,825,893 | Schechter | Mar. 4, 1958 |

FOREIGN PATENTS

| | | |
|---|---|---|
| 622,640 | Great Britain | May 5, 1949 |